United States Patent
Zhang

(10) Patent No.: US 9,264,413 B2
(45) Date of Patent: Feb. 16, 2016

(54) MANAGEMENT OF NETWORK DEVICES UTILIZING AN AUTHORIZATION TOKEN

(71) Applicant: QUALCOMM Incorporated, San Diego, CA (US)

(72) Inventor: Jiang Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 13/787,522

(22) Filed: Mar. 6, 2013

(65) Prior Publication Data

US 2014/0165155 A1 Jun. 12, 2014

Related U.S. Application Data

(60) Provisional application No. 61/734,315, filed on Dec. 6, 2012.

(51) Int. Cl.
| | |
|---|---|
| *H04L 29/06* | (2006.01) |
| *H04L 12/24* | (2006.01) |
| *H04W 12/04* | (2009.01) |
| *H04W 12/06* | (2009.01) |
| *H04L 12/14* | (2006.01) |

(52) U.S. Cl.
CPC ............ *H04L 63/08* (2013.01); *H04L 12/1407* (2013.01); *H04L 41/28* (2013.01); *H04L 63/0823* (2013.01); *H04W 12/04* (2013.01); *H04W 12/06* (2013.01)

(58) Field of Classification Search
CPC . H04L 63/08; H04L 63/0807; H04L 63/0823; H04L 63/0884; H04L 63/10; H04L 63/101; H04L 63/0853; H04L 12/1407; H04L 41/28; G06F 21/62; H04W 12/06; H04W 12/04; H04W 12/08

USPC ............................................................ 726/4
See application file for complete search history.

(56) References Cited

U.S. PATENT DOCUMENTS

| | | | | |
|---|---|---|---|---|
| 8,171,525 B1 * | 5/2012 | Pelly et al. | ........................ | 726/2 |
| 8,839,360 B1 * | 9/2014 | Orr et al. | ............................ | 726/2 |
| 2003/0079136 A1 * | 4/2003 | Ericta | ................... | H04L 63/101 |
| | | | | 713/185 |
| 2003/0084172 A1 * | 5/2003 | deJong et al. | ................. | 709/229 |
| 2004/0098715 A1 | 5/2004 | Aghera et al. | | |
| 2004/0215964 A1 * | 10/2004 | Barlow et al. | ................. | 713/172 |
| 2004/0243824 A1 * | 12/2004 | Jones | ............................ | 713/200 |
| 2005/0102404 A1 * | 5/2005 | Tabbara et al. | ............... | 709/227 |

(Continued)

FOREIGN PATENT DOCUMENTS

WO WO-9900960 A1 1/1999

OTHER PUBLICATIONS

International Search Report and Written Opinion—PCT/US2013/073648—ISA/EPO—Mar. 5, 2014.

(Continued)

*Primary Examiner* — Darren B Schwartz
(74) *Attorney, Agent, or Firm* — Won Tae C. Kim

(57) ABSTRACT

Aspects of the invention may relate to an apparatus, system, and method for the management of network devices utilizing an authorization token. In one embodiment, an authorization token received from a service provider may be verified using an authorization credential to determine if the service provider is authorized to perform requested operations with the network device. Further, operation privileges may be enforced that are contained in the authorization token.

36 Claims, 3 Drawing Sheets

(56) References Cited

U.S. PATENT DOCUMENTS

| | | | |
|---|---|---|---|
| 2006/0037063 A1* | 2/2006 | Clemmons et al. | 726/4 |
| 2007/0143826 A1* | 6/2007 | Sastry et al. | 726/2 |
| 2007/0283012 A1* | 12/2007 | Chu | H04L 41/022 709/225 |
| 2009/0064303 A1* | 3/2009 | Dickinson et al. | 726/10 |
| 2009/0077643 A1* | 3/2009 | Schmidt | H04W 8/265 726/6 |
| 2010/0062808 A1* | 3/2010 | Cha | G06Q 20/3229 455/558 |
| 2010/0205432 A1* | 8/2010 | Corda et al. | 713/159 |
| 2010/0212004 A1* | 8/2010 | Fu | 726/9 |
| 2010/0227591 A1 | 9/2010 | Park et al. | |
| 2010/0299744 A1* | 11/2010 | Mardiks | 726/17 |
| 2011/0296182 A1* | 12/2011 | Jia et al. | 713/168 |
| 2012/0108205 A1 | 5/2012 | Schell et al. | |
| 2012/0331292 A1* | 12/2012 | Haggerty et al. | 713/168 |
| 2013/0012168 A1 | 1/2013 | Rajadurai et al. | |
| 2013/0097079 A1* | 4/2013 | Bruder | 705/44 |
| 2013/0111546 A1* | 5/2013 | Gargiulo et al. | 726/1 |
| 2013/0173736 A1* | 7/2013 | Krzeminski et al. | 709/213 |
| 2013/0231087 A1* | 9/2013 | O'Leary | 455/411 |
| 2013/0273889 A1* | 10/2013 | Lobmaier | 455/411 |
| 2013/0340059 A1* | 12/2013 | Christopher et al. | 726/7 |
| 2014/0011541 A1* | 1/2014 | Cormier et al. | 455/558 |
| 2014/0140509 A1* | 5/2014 | Chastain | G06F 21/6227 380/270 |
| 2014/0179271 A1* | 6/2014 | Guccione et al. | 455/410 |

OTHER PUBLICATIONS

Bender H. et al., "Evolution of SIM provisioning towards a flexible MCIM provisioning in M2M vertical industries," 16th International Conference on Intelligence in Next Generation Networks, Oct. 2012, pp. 57-64.

GSM Association, "Embedded SIM Task Force Requirements and Use Cases," V1.0, Feb. 21, 2011, pp. 1-38.

* cited by examiner

MANAGEMENT OF NETWORK DEVICES UTILIZING AN AUTHORIZATION TOKEN

CROSS-REFERENCE TO RELATED APPLICATIONS

This application claims the benefit of priority of prior provisional patent application No. 61/734,315, entitled MANAGEMENT OF NETWORK DEVICES UTILIZING AN AUTHORIZATION TOKEN, filed on Dec. 6, 2012, which application is incorporated herein by reference.

BACKGROUND

1. Field

The present invention relates generally to the management of network devices utilizing an authorization token.

2. Relevant Background

Currently, universal integrated circuit cards (UICCs) are owned, managed, and distributed by a particular mobile network operator (MNO) and are removable from the network device (e.g., a cell phone). For example, if a network device owner wants to change a subscription service to a different MNO, the network device owner needs to remove the UICC and put in a new UICC from the new service provider (e.g., another MNO). This is a costly and time consuming process. Further, in many machine-to-machine (M2M) use cases, such as, smart meters or wireless modems in a car, changing the UICC likewise requires a great deal of work and is very costly.

Embedded universal integrated circuit cards (eUICCs) are currently being considered for use in network devices (e.g., cell phones, tablets, M2M devices, etc.) which may reduce costs and eliminates the need to remove and replace UICCs from network devices. However, embedded UICCs (eUICCs) for use in network devices present many challenges related to ownership management, subscription management, as well as, security issues. As a particular example, techniques to prevent unauthorized entities from loading, enabling, disabling, and/or deleting services and profiles need to be addressed as well as techniques to allow authorized entities to enable services and manage profiles. This is pertinent both for user-controlled network devices (e.g., cell phones) as well as M2M devices that a user typically does not physically interact with.

SUMMARY

Aspects of the invention may relate to an apparatus, system, and method for the management of network devices utilizing an authorization token. In one embodiment, an authorization token received from a service provider may be verified using an authorization credential to determine if the service provider is authorized to perform requested operations with the network device. Further, operation privileges may be enforced that are contained in the authorization token.

DETAILED DESCRIPTION

The word "example" or "exemplary" is used herein to mean "serving as an example, instance, or illustration." Any aspect or embodiment described herein as "exemplary" or as an "example" in not necessarily to be construed as preferred or advantageous over other aspects or embodiments.

Figure 1:
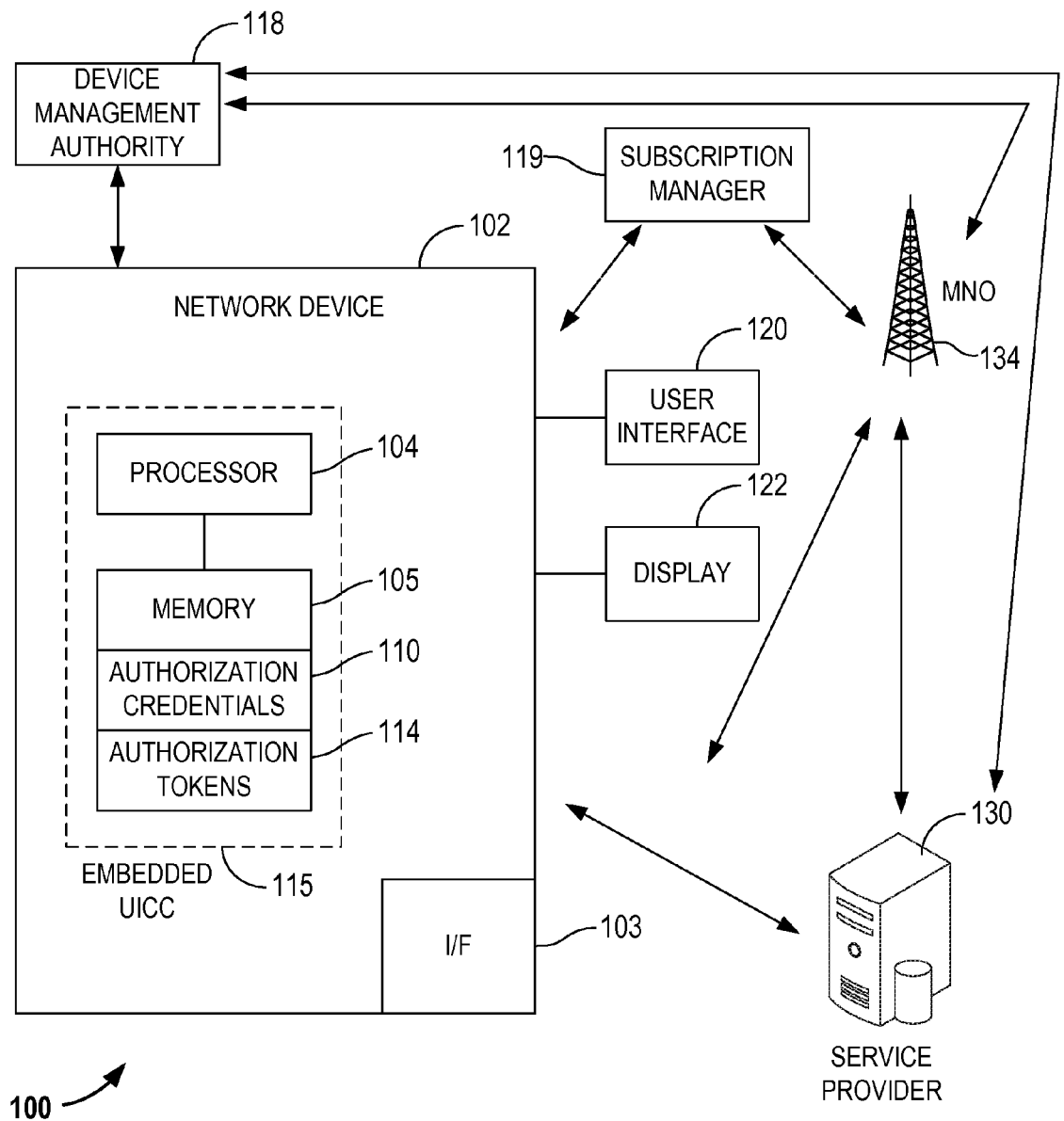
FIG. 1 is block diagram of a system in which embodiments of the invention related to the management of network devices utilizing an authorization token may be practiced.

With reference to FIG. 1, FIG. 1 is a block diagram of a system 100 in which embodiments of the invention may be practiced. As will be described, embodiments of the invention relate to a network device 102 that includes an interface 103, a processor 104, and a memory 105 that may store an authorization credential(s) 110 and an authorization token(s) 114. In one embodiment, at least the processor 104 and the memory 105 may be configured in an embedded universal integrated circuit card (eUICC) 115. However, the eUICC 115 may include some or all of the components regularly utilized by an UICC.

As will be described in more detail later, processor 104 may execute functions including: generating an authorization token 114 using an authorization credential 110; commanding the transmission of the authorization token 114 to a device management authority 118 or to a service provider 134,130 (if authorized by the device management authority 118) via the network interface (I/F) 103 through a link; verifying the authorization token 114 received back from the service provider 134,130 using the authorization credential 110 to determine if the service provider 134,130 is authorized to perform requested operations with the network device 102; and enforcing operation privileges contained in the authorization token 114. Although one authorization credential and one authorization token are referred to, it should be appreciated that multiple authorization credentials and authorization tokens may be utilized. Also, the device management authority 118 generally refers to the owner of the network device 102 or an entity that has the authority to authorize another entity to manage the data or service on the eUICC 115 or the network device 102.

Further, it should be appreciated that network device 102 may be any type of suitable network device (e.g. laptop computer, mobile device, non-mobile device, smart phone, cell phone, tablet, personal digital assistant (PDA), machine-to-machine (M2M) device, personal computer, server computer, etc.) having a processor 104 and a memory 105 to implement the previously described functionality and the hereinafter to be described functionality.

Also, network device 102 may include a user interface 120 which may be any suitable type of input mechanism, e.g., keyboard, keypad, touch-screen, voice recognition, microphone, etc. Further, I/F 103 may be a suitable wireless interface and may include suitable transceiver components (e.g. a wireless transmitter and receiver) to send and receive data over a wireless link or may be a suitable wired interface for connection by a suitable cable, wire, etc. (e.g., a wired link). Therefore, the term links to be hereinafter described may be wireless or wired links. Additionally, network device 102 may include a display device 112, such as, a commonly used display device that is implemented with a network device.

In one embodiment, in order to address issues related to owner authorization and security for embedded universal integrated circuit cards (eUICCs), an authorization token 114 of a network device 102 may be used to authorize an entity (e.g., a service provider 134,130) to provide a service for the network device 102 and to specify its operation privileges with the network device, as will be described in detail hereinafter.

As an example, as shown in FIG. 1, network device 102 may communicate via various links with service providers 134,130. As an example, a service provider may be a mobile network operator (MNO) 134. Further, as will be described, an authorization credential 110 may be selected and programmed into the memory 105 of the eUICC 115 and an authorization token 114 may also be stored in memory 105. It should be appreciated that authorization credentials 110 may be at least one of a binary string, a password, a secret key, a public key, or a combination thereof.

Figure 2:
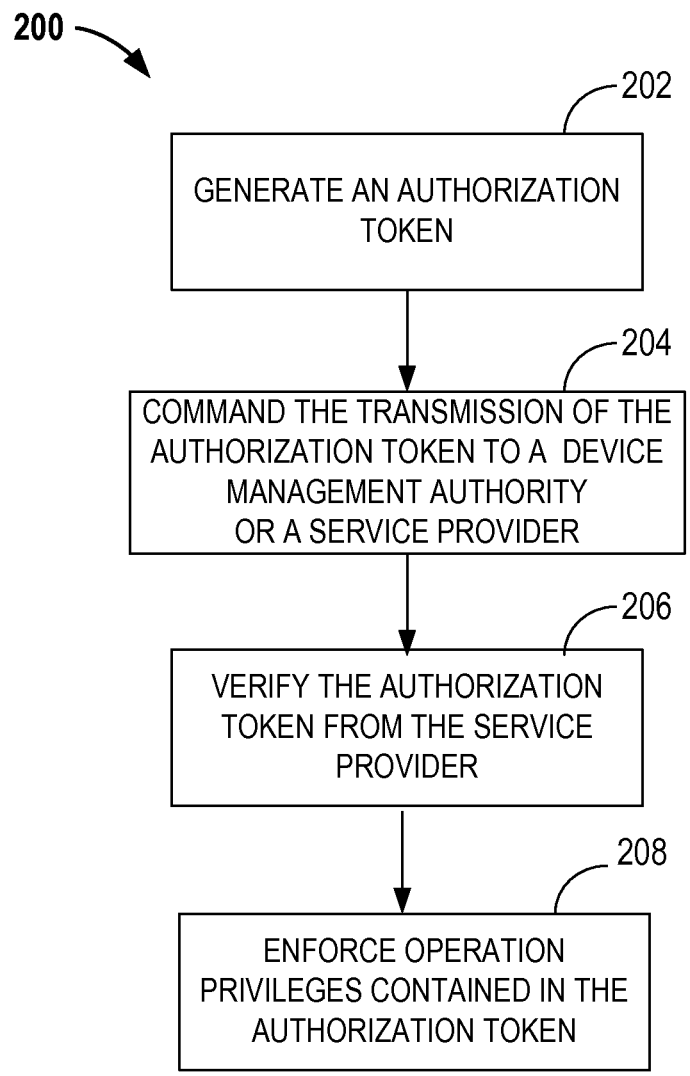
FIG. 2 is a flow diagram illustrating a process implemented by a network device to utilize an authorization token.

Turning briefly to FIG. 2, FIG. 2 is a flow diagram illustrating a process 200 to generate and verify an authorization token 114. In particular, at block 202, processor 104 may generate an authorization token 114 that may be based upon an authorization credential 110. Next, at block 204, processor 104 may command a transmission of the authorization token 114 to a device management authority 118 or to a service provider 134,130 if authorized by the device management authority 118. Further, at block 206, based upon an authorization token 114 received from a service provider 134,130, processor 104 may verify the authorization token 114 from the service provider using the authorization credential 110 to determine if the service provider is authorized to perform requested operations with the network device 102. Additionally, at block 208, processor 104 may enforce operation privileges contained in the authorization token.

Additionally, processor 104 may further execute functions to specify operation privileges associated with services that are allowable from the service provider 134,130 that are contained and transmitted in the authorization token 114. For example, such operation privileges may include loading, deleting, enabling, or disabling a set of data or services of the service provider 134,130.

Figure 3:
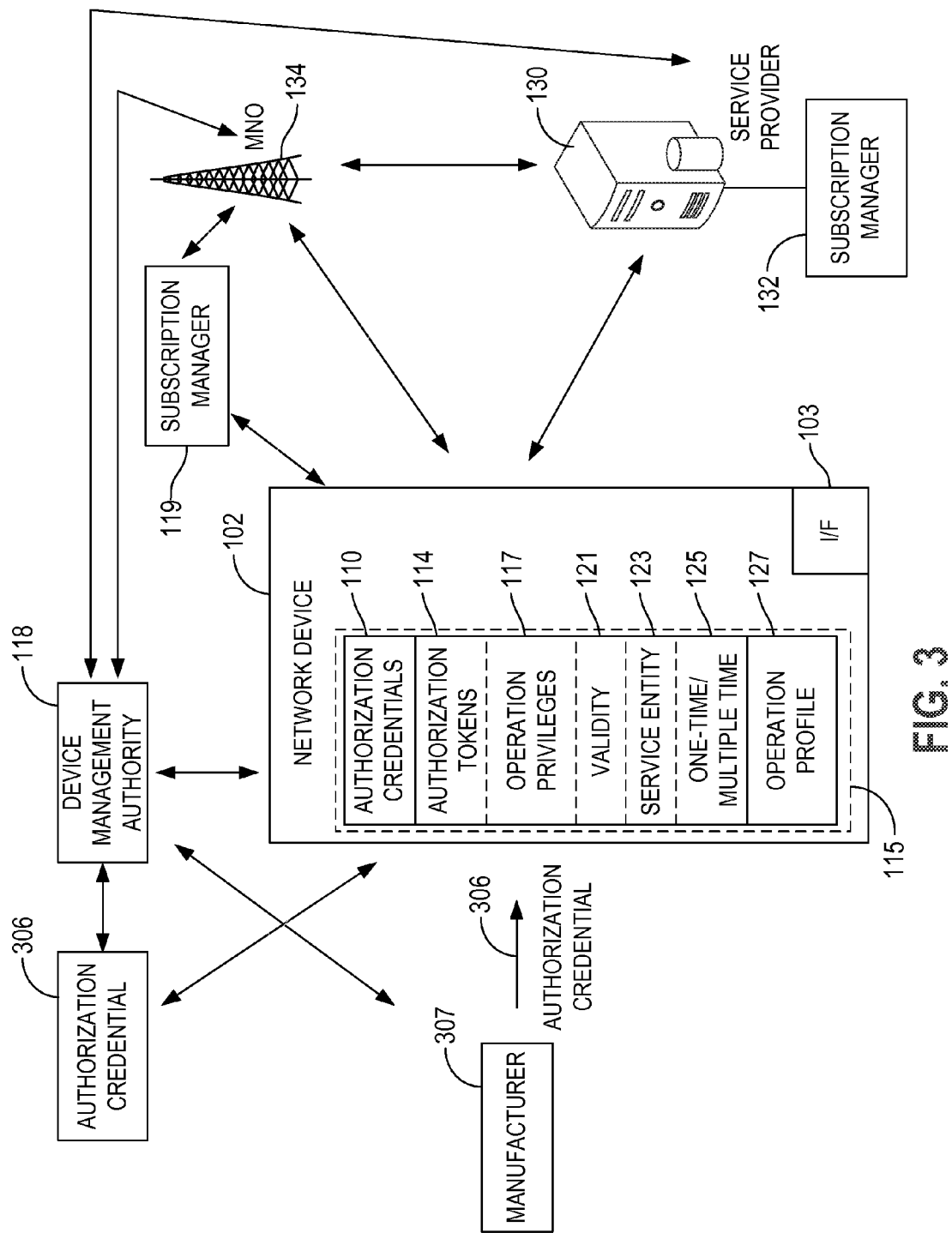
FIG. 3 is block diagram particularly showing a network device utilizing an authorization token.

With additional reference to FIG. 3, an authorization credential 110 is typically created and stored in the eUICC 115 such that only the device management authority 118 may access it. Alternatively, a copy of the authorization credential 306 may be given to the device management authority 118 such that the device management authority 118 may use the authorization credential 306 without access to the network device 102. As a particular example, the manufacturer 307 of the eUICC 115 may create the authorization credential 306 and store it in the eUICC 115 or the network device 102 as shown as authorization credential 110. However, the authorization credential 306 may also be provided to the device management authority 118 which may hold a copy. Again, the device management authority 118 is considered to be the "owner" of the eUICC 115 and/or the network device 102.

Utilizing this methodology, if the device management authority 118 wants to authorize an entity (e.g. a service provider 134,130), which is typically in association with a subscription manager 119,132 to manage subscriptions and profiles, to be able to access the eUICC 115 of the network device 102 and to manage operations on the eUICC 115, the device management authority 118 may generate an authorization token 114 for use by the service provider 134,130. Alternatively, the device management authority 118 may authorize the network device 102 to generate the authorization token 114 and transmit it to the service provider 134,130 while subscribing to the service from the service provider 134,130. Later the service provider 134,130 may transmit the authorization token 114 to its associated subscription manager 119,132. While the subscription manager 119,132 is trying to access the network device 102 or the eUICC 115 to manage the service on the eUICC 115 or the network device 102, it will present the authorization token 114 to the eUICC 115 to prove that it is authorized by the device management authority 118. The eUICC 115 will use the authorization credential 110 to verify the authorization token 114 and to confirm that the subscription manager 119, 132 is authorized by the device management authority 118. Inside the authorization token 114, the device management authority 118 may specify the operation privileges 117 for the service provider 134,130.

In particular, as an example, the authorization token 114 may be created with the device management authority's authorization credential 306 such that only the device management authority 118 can create this authorization token 114. When the device management authority 118 needs to authorize a service provider 134,130 to access the eUICC 115 (e.g., when the device management authority 118 wants to subscribes to a new service provided by the service provider 134,130), network device 102 via I/F 103 transmits the authorization token 114 to the service provider 134,130. It should be appreciated that either the device management authority 118 or the network device 102 may transmit the authorization token 114. Conversely, when the authorized service provider 134,130 attempts to access the eUICC 115 of the network device 102, the service provider 134,130 transmits the authorization token 114 to the eUICC 115 of the network device 102 and the eUICC may verify the authorization token using the device management authority's authorization token 114 stored in the eUICC. In particular, the network device 102 can verify the authorization token 114 from the service provider 134,130 using the authorization credential 110 to determine if the service provider is authorized to perform requested operations with the network device.

In other embodiments, if the network device 102 is not accessible for the device management authority 118 to generate the authorization token 114, the authorization token 114 may be generated outside of the network device 102, such as by the device management authority 118 using the authorization credential 306. For example, the device management authority 118 may include a copy of the authorization credential 306 (e.g., stored in a secure memory) and may input the authorization credential 306 into a computer program to generate the authorization token 114. And then the device management authority 118 may transmit the authorization token 114 to the service provider 134,130, as an example, when the authorization token 114 is not transmitted to the service provider by the network device 102. Later the service provider 134,130 may transmit the authorization token 114 to the eUICC 115 directly or via the subscription manager 119, 132 to prove to the eUICC 115 that the device management authority 118 has authorized the service provider 134,130 or the subscription manager 119, 132 to provide service on the eUICC 115.

Therefore, the device management authority 118 (i.e., the owner of the network device) may generate the authorization token 114, set the operation privileges 117 in the authorization token 114, and may transmit the authorization token 114 to the service provider 134,130. However, the authorization token 114 may also be directly transmitted by the network device 102 to the service provider 134,130. Thus, as previously described, authorization token 114 generation may occur at the network device 102 itself, but authorization token 114 generation may also occur outside the network device 102. For example, the management authority 118 may make a copy of the authorization credential 306 and store it securely. In this way, many network devices 102 may be managed by the device management authority 118 at the same time without accessing each network device 102. Furthermore, if the device management authority 118 sets the same authorization credential 110 in many network devices 102, one authorization token 114 may be used for all the network devices 102 that have the same authorization credential 110. Further, by having the authorization credential 306 stored outside of the network device 102, the device management authority 118 can generate the authorization token 114 without having to access/connect to the network device. This may be useful for some use cases in which the network device 102 is deployed remotely and the device management authority 118 has lost access/communication with the network device 102. In order to activate a new service, the device management authority 118 can use the stored authorization credential 306 to generate an authorization token 114 to give to a new service provider (e.g. MNO 134) to load an operational profile 127 to the eUICC 115 to enable the new network service for the network device 102. It should be appreciated that the operational privileges 117 stored in the authorization token 114 are set by the device management authority 118 to provide the rules to specify what a service provider is allowed to do. The operational profile 127 may be a set of data that may be used to enable a service. The operation profile 127 may be loaded by the subscription manager 132,119 and/or the service provider 134,130 into the eUICC 115 to enable the service, as will be described in more detail hereinafter.

It should be appreciated that various services may be provided by service providers 134,130 and each of the service providers may include a subscription manager 119,132 associated with them. As an example, a service provider 134 may be a mobile network operator (MNO), for example, to provide cell-phone service to a network device 102. As another example, a service provider 130 may be a music company that provides music to a network device 102. Service providers may provide services to a device with a user physically controlling the device (e.g., cell phone, smart phone, laptop computer, tablet, etc.) or a device generally without a user physically controlling the device such as a smart meter. Also, service providers 134,130 typically cooperate with subscription managers 119,132 (which may be managed by the service provider itself or by another company) to manage the subscriptions, profiles, and operations for a network device's use of services. Therefore, service providers 134,130 in cooperation subscription managers 119,132 may provide a wide variety of services, such as: mobile network connectivity services, music services, texting services, video services, storage services, etc. In particular, for M2M network devices, such services may include global positioning system (GPS), traffic reporting and mapping services for cars, and dynamic meter reading service for smart meters.

Embodiments of the invention generally relate to the owner's or device management authority's 118 authorization and security for an eUICC 115 of a network device 102 by utilizing an authorization token 114 to authorize a service provider 134,130 to provide a service for the network device 102 and to specify the service providers' operation privileges 117 with the network device 102. The network device 102 may communicate via various links with service providers 134,130 and subscription managers 119,132. As an example, an authorization credential 110 may be selected and programmed into the eUICC 115 and an authorization token 114 may also be stored in the eUICC 115. Moreover, the operation privileges 117 may be specified in the authorization token 114 and the eUICC 115 may verify the operation privileges and make sure that service provider's rights are not beyond the privileges specified by the device management authority 118. Therefore, a plurality of different services may be useable by a network device 102 from various service providers and the operation privileges can be controlled by the device management authority 118. Also, as will be described in more detail hereinafter, the validity 121 of the operation privileges 117 (e.g., how long authorization remains valid (e.g., an expiration time)) may be specified in the authorization token 114. Further, as will be described in more detail hereinafter, the authorization token 114 may have other attributes that are stored in the authorization token 114 such as: service entity attribute 123 that specifies what service provider is authorized; and a one-time or multiple time attribute 125 that indicates whether the authorization token is a one-time use authorization token or a multiple-time use authorization token. As will be described in more detail hereinafter, with the multiple time token, a usage counter may be utilized to count how many times the token has been used.

A particular example will now be provided. For example, a utility company may be the device management authority 118 and may be the owner of a huge amount of network devices 102 (e.g., smart meters). The utility company 118 does not want to manage the operational profile 127 (which contains the network access information to obtain needed cellular services from an MNO service provider 134) on the eUICC 115. Therefore, if utility company 118 wants to subscribe to the service of the MNO service provider's 134, it will generate an authorization token 114 for the MNO service provider's 134 subscription manager 119 to load MNO's operational profile 127 into the network device's 102 eUICC 115 to give to the MNO 134. When, subscription manager 119 transmits its operational profile 127 to the eUICC 115, it may also get the authorization token 114 from the MNO 134 and transmit it to the eUICC 115 to request the ability to load the operational profile 127 so that the services can be enabled. Once the eUICC 115 verifies that the authorization token 114 has been issued by the utility company/owner 118 to MNO 134 and its subscription manager 119, then the eUICC 115 will allow the subscription manager 119 to load and install the operational profile 127 of the MNO 134. Otherwise, the operational profile 127 cannot be loaded and consequently the service cannot be enabled.

It should be appreciated that these aspects are beneficial in that: 1) in the instance that a large quantity of M2M devices 102 are being utilized, in order to change a subscription service from a service provider 134, only one authorization token 114 may be given to the new service provider 134; and 2) the device management authority 118 does not need to change eUICC configuration/settings before a new authorized service provider 134 can access the eUICC 115. Further, although the previous example refers to a utility company as the owner/device management authority 118 subscribing to an MNO service provider 134 for an M2M network device, the same methodology would apply to an individual user/device management authority 118 subscribing to an MNO for a cell-phone network device. Moreover, the same methodology would apply to owner/device management authority 118 subscribing to a wide variety of different types of services from a service provider 130 providing a wide variety of services (e.g., music services, texting services, video services, storage services, etc.)

As previously described, embodiments of the invention relate to managing ownership and operation privileges for a third party (such as subscription manager 119) to manage the services on a remote network device 102. In particular, an authorization credential 110 may be set for the network device 102 and, in particular, may be set inside the eUICC 115 of the network device 102. As an example, a manufacturer 307 may set the authorization credential 110 into the network device 102. The authorization credential 110 may be a binary string, a password, a secret key, a public key, or a Root CA certificate that contains a public key, etc. In particular, the authorization credential 110 may be set by the device manufacture 307 or by the device management authority 118. Network device 102 or the eUICC 115 should protect this authorization credential 110 securely.

Further, there are various options related to the management of authorization credentials. For example, the authorization credential 110 may be stored in the eUICC 115 and the device management authority 118 may be provided with a password to access it. This allows device management authority 118 to change the password and the authorization credential 110. Additionally, device management authority 118 may store the authorization credential 306 locally on a computing device (e.g., a desktop, lap-top, other mobile device, etc.) as a securely stored authorization credential 306. As another example, the manufacturer 307 may provide an application running on the computer or mobile device/cellphone to protect the authorization credential and to help generate the authorization credential 110. Again, device management authority 118 may authenticate itself to the network device 102 via a password.

As yet another example, the manufacturer 307 may provide an online service to help the device management authority 118 manage the authentication credential 306. For example, the manufacturer 307 may encrypt an authorization credential 306 and store it in the cloud where it can be accessed by the device management authority 118. In this way, authentication credential decryption and authorization token generation may be accomplished on the client side.

Moreover, when the authorization credential 110 is in the eUICC 115, the device management authority 118 may login into the eUICC 115 of the network device 102 to generate an authorization token 114 via a secure connection such as using transport layer security/secure sockets layer protocol (TLS/SSL) (as an example). This may be done before deploying the network device 102. Further, when using the authorization credential 110 on the network device 102 or on a web server, the device management authority 118 may log onto the network device 102 or its corresponding web account. In this way, the authorization token 114 can be emailed to the service provider 130 or uploaded online.

As another example, the corresponding authorization credential information 306 may be passed to eUICC 115 of the network device 102 (e.g., from a manufacturer 307 or device management authority 118) so that the network device 102 can generate an authorization token 114 that may be used to give an operation privilege to a third party entity (e.g. hereinafter referred to as service provider 134,130). As previously described, the service provider 134,130 works in cooperation with a subscription manager 119,130.

Thus, device management authority 118 may have the network device 102 generate an authorization token 114 that may be presented to a service provider 134,130. It should be appreciated that if a symmetric key mechanism or password mechanism is utilized that the authorization credential 306 provided to the device management authority 118 may be the same as the authorization credential 110 stored inside the network device 102. If using a public key mechanism, the authorization credential 306 provided to the device management authority 108 may be the pairing part of the authorization credential 110 stored in the eUICC 115 of the network device 102.

As to the authorization token 114, in one embodiment, the authorization token 114 of the eUICC 115 of the network device 102 may be a digital token that specifies operation privileges 117 (stored in the authorization token 114) for a specified or unspecified service provider 134,130 and/or subscription manger 119,132. Further, the authorization token 114 received back from service provider 134,130 may be verified by the eUICC 115 of the network device 102 to confirm that the operation privileges are authorized by the device management authority 118. Optionally, if the authorization token 114 is stored in the eUICC 115 already, the service provider 134,130 may not be required to present the token each time when the service provider 134,130 tries to access the eUICC. As previously described, the authorization token 114 may be generated by the owner/device management authority 118 logging into the eUICC 115 of the network device 102 locally or by the device management authority 118 logging into the eUICC 115 of the network device 102 remotely from outside (e.g., via remote access). In particular, the authorization token 114 may be portable and is beneficial in that it may be transmitted to a service provider 134,130 to obtain pre-defined operation privileges without exposing the authorization credentials 110.

Moreover, a variety of different types of information may be included in the data of the authorization token 114. For example, this data may include: token ID, sequence number, signature data (e.g., digital signature with a public key or message authentication checksum (MAC) with a symmetric key), as well as various optional information. Optional information may include: eUICC ID, service provider ID, subscription manager ID, device management authority ID or IDs of authorized profiles, and authorized privileges (e.g., particular profiles, particular management operations, etc.).

There are many methods for the device management authority 118 to use the authorization credential 110 to generate the authorization token on the eUICC. For example, network device 102 may provide management commands for the device management authority 118 to generate authorization token, and device management authority 118 may log into the network device 102 to perform these management commands. The device management authority 118 may use the credential (e.g., password) that is owned only by the device management authority to log into the network device 102.

As an example, device management authority 118 may utilize the authorization credential 110 to create an authorization token 114 that may be specified with particular privileges (e.g., operation privileges 117) that may be utilized by a third party for management of the network device 102. For example, one of the privileges may be what operations are allowable such as: loading, deleting, enabling, or disabling of a set of data or services of the service provider 134,130. Another privilege may be determining which entities (e.g., service providers) can perform operations such as: a list of the IDs of the service providers 134,130 and subscription managers 119,132 that may be utilized. For example, the service entity 123 may be specified in the authorization token 114. Another example of privileges that may be specified relates to the validity of the operation privileges. As an example, the validity 121 may be specified in the authorization token 114. For example, for how long authorization remains (e.g., an expiration time) may be specified as the validity component. Yet another privilege that may be specified is where operations can be performed, e.g., a list of the eUICC IDs. A further example of a privilege that may be specified relates to on which objects the operations can be performed, e.g., which operation profile 127 can be managed by a service provider 134,130 or a subscription manager 119,132. An additional operational privilege that may be specified in the authorization token 114 is how many times operations can be performed such as one-time or multiple time use 125, as will be described in more detail hereinafter.

After the authorization token 114 has been defined, the authorization token 114 may be provided to the service provider 134,130 that will perform the services via a connection. When the service provider 134,130 transmits the commands to network device 102 via a connection, service provider 134,130 may provide the authorization token 114 such that the network device 102 can verify that it is authorized by the device management authority 118 using the authorization credential 110 stored within the network device 102. If verified, the operation privileges specified in the authorization token 114 may be allowed. Otherwise, the services may be rejected.

As a particular example, device management authority 118 may generate an authorization token 114 that is transmitted via a link to service provider 134. Service provider 134 may transmit the authorization token 114 to subscription manager 119 which may then load operation profile 127 into the eUICC 115 of the network device 102 using the authorization token 114. The eUICC 115 may utilizes its own authorization credential 110 to verify that the subscription manager 119 is authorized to load the operation profile 127. Network device 102 may then utilize services associated with service provider 134.

Thus, the authorization token 114 may be given to a third party (e.g., service provider 134) to use when the device management authority 118 would like to subscribe to a service provided by the service provider 134. For example, if device management authority 118 wants to subscribe to a mobile network operator (MNO) service, network device 102 may generate an authorization token 114 for the particular MNO (e.g., MNO 134) to allow MNO 134 or the MNO's subscription manager 119 to load operation profile 127 into the eUICC 115 of the network device 102 and consequently manage the loaded operation profile with a credential set by the MNO 134 and the network device can implement various services associated with service provider 134. Further, as another example, when the device management authority 118 orders the service from MNO's 134 website, the device management authority 118 may submit the authorization token 114 to the website such that MNO 134 can proceed with the authorization token 114 in a similar manner. Meanwhile other MNOs cannot load operation privileges into the eUICC 115 of the network device 102 without the device management authority's authorization.

It should be appreciated that the authorization token 114 may be generated either inside the network device 102 or outside the network device 102. For example, the device management authority 118 may login to the network device 102 using a password and request that the network device 102 generate the authorization token 114. In this way, the device management authority 118 may only need to know the password and the longer authorization credential 110 may just be stored inside the network device 102. However, the authorization token 114 may be exported from the network device 102 and be given to another entity, as previously described.

As an example, an external application may be used to generate the authorization token 114, as well. For example, a utility company may have a secure token to generate the authorization token 114 for all of its smart meters (i.e., network devices 102) using a private key. As an example, there may be millions of these network device smart meters 102. If the corresponding public key is set to all of the smart meters (e.g. network devices 102), the smart meters can verify this authorization token 114 to determine if an operation is authorized. New programs may be loaded onto all of the smart meter network devices 102 based upon the authorization token remotely.

Further, it should be appreciated that an authorization token 114 may be utilized for a one-time use or for multiple-time uses which may be specified by one-time/multiple time attribute 125. For example, a one-time use token may be used only for one time to authorize a new service provider 130 and subscription manager 132. This may be for an unlimited amount of a time or for a pre-determined period of time. In this way, the authorization token 114 may be set to be valid only for a certain pre-determined time period, to expire at a specific time, or to be useable until canceled. Further, a multiple-time use token can be set for use during multiple specified times. As an example, the multiple time token may utilize a usage counter to count how many times the token has been used. Thus, the authorization tokens 114 may utilize incremental sequence numbers. Also, once a newer authorization token is used, the older authorization token may be invalidated. Therefore, it should be appreciated that authorization tokens 114 may be revoked or invalidated. For example, authorization tokens 114 may be revoked based upon a token ID number or based upon a sequence number.

Examples of usage cases will now be described.

As an example of an initial service provider 134 set up, manufacturer 307 may provide an authorization credential 306 and password to the device management authority 118 of the network device 102. Based upon the device management authority 118 logging into the network device 102 with the password and specifying the privileges in the token, the authorization token 114 is generated with the authorization credential 110. The network device 102 via I/F 103 transmits the authorization token 114 via a link to the service provider 134 along with other eUICC 115 information. In this way, device management authority 118 is providing the authorization token 114 to the service provider 134 and to the subscription manager 119 to provide permission to manage the eUICC 115 of the network device 102. This provides a secure environment in that only an authorized service provider 134 and subscription manager 119 have permission to manage the network device 102 such that a secure method for authorization is provided.

As another example, new service providers may be added. In this example, device management authority 118 may generate an authorization token 114 either by logging into the eUICC 115 of the network device 102 or by generating the authorization token 114 externally. The network device 102 transmits the authorization token 114 via I/F 103 through a link to a new service provider 130 in conjunction with other eUICC 115 information. In this way, the authorization token 114 may be generated at any time without the subscription manager 132 being knowable to the device management authority 118 which provides flexibility in managing the authorization.

As a further example, a service provider may be changed. In this example, the device management authority 118 generates an authorization token 114, either by logging into the eUICC 115 or by generating the authorization token 114 externally. The network device 102 transmits the authorization token 114 via I/F 103 through a link to the new service provider 130 along with other eUICC 115 information. In this way, the authorization token 114 may be generated at any time without knowing the actual subscription manager 132 of the service provider 130. This provides a very flexible method for managing ownership.

As yet another example, multiple network devices 102 may be controlled. For example, a device management authority 118 may generate an authorization token 114, either by logging into the eUICC 115 or it may be generated externally. If multiple eUICC's share the same device management authority credentials, device management authority 118 may provide the same authorization token 114 to a single service provider 134. The subscription manager 119 may manage all of the eUICC's 115 of all of the network devices 102 using the same authorization token 114. This provides an efficient methodology for controlling multiple eUICC's 115 of multiple network devices 102.

It should be appreciated that there are many previously-described examples of how an authorization token 114 may be utilized to efficiently and securely manage a network device 102 in association with a service provider 134,130. As a particular example, the authorization credential 110 in conjunction with a password to generate an authorization token 114 provides a very secure and robust approach. In particular, the authorization token 114 approach provides security and improves flexibility for the device management authority 118 to manage the operation privileges on the eUICC 115 of the network device 102 for using 3$^{rd}$ party service providers 134, 130, especially in the case when the subscription manager 119,132 does not need to be known to the device management authority 118.

It should be appreciated that aspects of the invention previously described may be implemented in conjunction with the execution of instructions by a processor. Particularly, circuitry of the network device 102, including but not limited to processors, may operate under the control of a program, routine, or the execution of instructions to execute methods or processes in accordance with embodiments of the invention. For example, such a program may be implemented in firmware or software (e.g. stored in memory and/or other locations) and may be implemented by processors and/or other circuitry. Further, it should be appreciated that the terms processor, microprocessor, circuitry, controller, etc., refer to any type of logic or circuitry capable of executing logic, commands, instructions, software, firmware, functionality, etc.

It should be appreciated mobile or network devices may communicate via one or more wireless communication links through a wireless network that are based on or otherwise support any suitable wireless communication technology. In some aspects the network may comprise a body area network or a personal area network (e.g., an ultra-wideband network). In some aspects the network may comprise a local area network or a wide area network. A network device may support or otherwise use one or more of a variety of wireless communication technologies, protocols, or standards such as, for example, CDMA, TDMA, OFDM, OFDMA, WiMAX, and Wi-Fi. Similarly, a network device may support or otherwise use one or more of a variety of corresponding modulation or multiplexing schemes. A network device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile network device may therefore wirelessly communicate with other mobile devices, cell phones, other wired and wireless computers, Internet web-sites, etc.

The techniques described herein can be used for various wireless communication systems such as Code Division Multiple Access (CDMA), Time division multiple access (TDMA), Frequency Division Multiple Access (FDMA), Orthogonal Frequency-Division Multiple Access (OFDMA), Single Carrier FDMA (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers Interim Standard (IS)-2000, IS-95 and IS-856 standards. A TDMA system can implement a radio technology such as Global System for Mobile Communications (GSM). An OFDMA system can implement a radio technology such as Evolved Universal Terrestrial Radio Access; (Evolved UTRA or E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDM®, etc. Universal Terrestrial Radio Access (UTRA) and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet, a mobile computer, a laptop computer, a tablet, an entertainment device (e.g., a music or video device), a headset (e.g., headphones, an earpiece, etc.), a user I/O device, a computer, a server, a point-of-sale device, an entertainment device, a set-top box, or any other suitable device. These devices may have different power and data requirements In some aspects, a network device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A network device comprising:
   a network interface;
   a memory including an authorization credential, the memory being configured in a universal integrated circuit card (UICC); and
   a processor configured in the UICC to execute functions including:
      specifying operation privileges associated with a mobile network operator included in an authorization token, wherein the operation privileges include at least one of loading, deleting, enabling, or disabling a set of data or services of the mobile network operator within the UICC;
      commanding a transmission of the authorization token to a device management authority or to the mobile network operator if authorized by the device management authority;
      verifying the authorization token received from the mobile network operator using the authorization credential to determine if the mobile network operator is authorized to perform requested operations with the network device; and
      enforcing operation privileges contained in the authorization token.

2. The network device of claim 1, wherein the integrated circuit card UICC comprises an embedded universal integrated circuit card (eUICC).

3. The network device of claim 1, wherein the authorization token is generated within the network device based on the authorization credential or outside of the network device based on the authorization credential wherein a device management authority includes a copy of the authorization credential.

4. The network device of claim 3, wherein the device management authority transmits the authorization token to the mobile network operator, if the authorization token is not transmitted to the mobile network operator by the network device.

5. The network device of claim 1, wherein the authorization credential is at least one of a binary string, a password, a symmetric key, or a public key.

6. The network device of claim 1, wherein the services provided by the mobile network operator include at least mobile network connectivity service.

7. The network device of claim 1, wherein the mobile network operator associated with the operation privileges is specified in the authorization token.

8. The network device of claim 1, wherein a validity of the operation privileges is specified in the authorization token.

9. The network device of claim 1, wherein the authorization token is a one-time use authorization token or a multiple-time use authorization token.

10. A method implemented by a network device comprising:
    specifying operation privileges associated with a mobile network operator included in an authorization token, wherein the operation privileges include at least one of loading, deleting, enabling, or disabling a set of data or services of the mobile network operator within a universal integrated circuit card (UICC) of the network device;
    commanding, at the UICC of the network device, a transmission of the authorization token to a device management authority or to the mobile network operator if authorized by the device management authority;
    verifying, at the UICC of the network device, the authorization token received from the mobile network operator using an authorization credential to determine if the mobile network operator is authorized to perform requested operations with the network device; and enforcing, at the UICC of the network device, operation privileges contained in the authorization token.

11. The method of claim 10, wherein the authorization credential is stored in the UICC of the network device or with the device management authority.

12. The method of claim 10, wherein the authorization credential is at least one of a binary string, a password, a symmetric key, or a public key.

13. The method of claim 10, wherein the network device generates the authorization token based upon the authorization credential or a device management authority generates the authorization token based upon the authorization credential.

14. The method of claim 13, wherein the device management authority transmits the authorization token to the mobile network operator.

15. The method of claim 10, wherein the services provided by the mobile network operator include at least mobile network connectivity service.

16. The method of claim 10, further comprising specifying the mobile network operator that includes the operation privileges in the authorization token.

17. The method of claim 10, further comprising specifying a validity of the operation privileges in the authorization token.

18. The method of claim 10, wherein the authorization token is a one-time use authorization token or a multiple-time use authorization token.

19. A computer program product executed at a network device comprising:

a non-transitory computer-readable medium comprising code for:

specifying operation privileges associated with a mobile network operator included in an authorization token, wherein the operation privileges include at least one of loading, deleting, enabling, or disabling a set of data or services of the mobile network operator within a universal integrated circuit card (UICC) of the network device;

commanding, at the UICC of the network device, a transmission of the authorization token to a device management authority or to the mobile network operator if authorized by the device management authority;

verifying, at the UICC of the network device, the authorization token received from the mobile network operator using an authorization credential to determine if the mobile network operator is authorized to perform requested operations with the network device; and enforcing, at the UICC of the network device, operation privileges contained in the authorization token.

20. The computer program product of claim 19, wherein the authorization credential is stored in the UICC of the network device or with the device management authority.

21. The computer program product of claim 19, wherein the authorization credential is at least one of a binary string, a password, a symmetric key, or a public key.

22. The computer program product of claim 19, wherein the network device generates the authorization token based upon the authorization credential or a device management authority generates the authorization token based upon the authorization credential.

23. The computer program product of claim 22, wherein the device management authority transmits the authorization token to the mobile network operator.

24. The computer program product of claim 19, wherein the services provided by the mobile network operator include at least mobile network connectivity service.

25. The computer program product of claim 19, further comprising code for specifying the mobile network operator that includes the operation privileges in the authorization token.

26. The computer program product of claim 19, further comprising code for specifying a validity of the operation privileges in the authorization token.

27. The computer program product of claim 19, wherein the authorization token is a one-time use authorization token or a multiple-time use authorization token.

28. A network device comprising:

means for specifying operation privileges associated with a mobile network operator included in an authorization token, wherein the operation privileges include at least one of loading, deleting, enabling, or disabling a set of data or services of the mobile network operator within a universal integrated circuit card (UICC) of the network device;

means for commanding, at the UICC of the network device, a transmission of the authorization token to a device management authority or to the mobile network operator if authorized by the device management authority;

means for verifying, at the UICC of the network device, the authorization token received from the mobile network operator using an authorization credential to determine if the mobile network operator is authorized to perform requested operations with the network device; and means for enforcing, at the UICC of the network device, operation privileges contained in the authorization token.

29. The network device of claim 28, wherein the authorization credential is stored in the UICC of the network device or with the device management authority.

30. The network device of claim 28, wherein the authorization credential is at least one of a binary string, a password, a symmetric key, or a public key.

31. The network device of claim 28, wherein the network device generates the authorization token based upon the authorization credential or a device management authority generates the authorization token based upon the authorization credential.

32. The network device of claim 31, wherein the device management authority transmits the authorization token to the mobile network operator.

33. The network device of claim 28, wherein the services provided by the mobile network operator include at least mobile network connectivity service.

34. The network device of claim 28, further comprising means for specifying the mobile network operator that includes the operation privileges in the authorization token.

35. The network device of claim 28, further comprising means for specifying a validity of the operation privileges in the authorization token.

36. The network device of claim 28, wherein the authorization token is a one-time use authorization token or a multiple-time use authorization token.

* * * * *